United States Patent
DeFrancesco

(10) Patent No.: US 10,526,092 B2
(45) Date of Patent: Jan. 7, 2020

(54) TURBINE-ASSISTED CABIN AIR COMPRESSOR

(71) Applicant: Hamilton Sundstrand Corporation, Charlotte, NC (US)

(72) Inventor: Gregory L. DeFrancesco, Simsbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/477,905

(22) Filed: Apr. 3, 2017

(65) Prior Publication Data

US 2018/0281977 A1    Oct. 4, 2018

(51) Int. Cl.
| | |
|---|---|
| *B64D 13/08* | (2006.01) |
| *F04D 25/06* | (2006.01) |
| *F04D 25/04* | (2006.01) |
| *F04D 29/053* | (2006.01) |
| *F04D 29/58* | (2006.01) |
| *B64D 13/02* | (2006.01) |
| *B64D 13/06* | (2006.01) |

(52) U.S. Cl.
CPC ............. *B64D 13/08* (2013.01); *B64D 13/02* (2013.01); *F04D 25/045* (2013.01); *F04D 25/06* (2013.01); *F04D 29/053* (2013.01); *F04D 29/5826* (2013.01); *B64D 2013/0611* (2013.01); *B64D 2013/0618* (2013.01); *B64D 2013/0648* (2013.01)

(58) Field of Classification Search
CPC .................... B64D 13/08; B64D 13/02; B64D 2013/0648; B64D 2013/0618; F04D 29/5826; F04D 29/053
See application file for complete search history.

(56) References Cited

U.S. PATENT DOCUMENTS

| | | | |
|---|---|---|---|
| 4,261,416 A | 4/1981 | Hamamoto | |
| 4,262,495 A | 4/1981 | Gupta et al. | |
| 4,263,786 A | 4/1981 | Eng | |
| 4,419,926 A | 12/1983 | Cronin et al. | |
| 4,462,561 A * | 7/1984 | Cronin ................... | B64D 13/06 244/118.5 |
| 5,860,283 A * | 1/1999 | Coleman ................ | B64D 13/06 62/402 |
| 5,956,960 A | 9/1999 | Niggeman | |

(Continued)

FOREIGN PATENT DOCUMENTS

EP        2998224 A1    3/2016

OTHER PUBLICATIONS

EP Extended Search Report for EP Application No. 18165512.7 dated Aug. 20, 2018; 9 pages.

*Primary Examiner* — Kun Kai Ma

(74) *Attorney, Agent, or Firm* — Cantor Colburn LLP

(57) ABSTRACT

An airplane is provided. The airplane includes a motor-driven compressor assembly. The motor-driven compressor assembly includes a shaft, a motor, a compressor, and a turbine coupled to the compressor via the shaft. The motor provides a first power to the compressor via the shaft. The turbine receives and expands a second medium to provide a second power to the compressor via the shaft. The compressor receives and compresses a first medium in accordance with the first power provided by the turbine and the second power provided by the motor.

9 Claims, 3 Drawing Sheets

(56) References Cited

U.S. PATENT DOCUMENTS

| | | | |
|---|---|---|---|
| 5,967,461 A * | 10/1999 | Farrington | B64D 13/06 244/118.5 |
| 6,283,410 B1 | 9/2001 | Thompson | |
| 6,427,471 B1 | 8/2002 | Ando et al. | |
| 6,526,775 B1 * | 3/2003 | Asfia | B64D 13/06 62/402 |
| 6,928,832 B2 * | 8/2005 | Lents | B64D 13/06 62/401 |
| 7,467,524 B2 * | 12/2008 | Brutscher | B64D 13/06 62/401 |
| 7,721,554 B2 | 5/2010 | Balan et al. | |
| 9,003,814 B2 | 4/2015 | Zywiak et al. | |
| 9,016,075 B1 | 4/2015 | Johnson | |
| 9,169,024 B2 | 10/2015 | Voinov | |
| 9,254,920 B2 | 2/2016 | Zhou et al. | |
| 9,346,555 B2 | 5/2016 | Massey | |
| 9,656,756 B2 * | 5/2017 | Atkey | B64D 13/08 |
| 9,669,936 B1 * | 6/2017 | Fiterman | B64D 13/06 |
| 2004/0060317 A1 | 4/2004 | Lents et al. | |
| 2004/0231350 A1 * | 11/2004 | Kline | B64D 13/00 62/244 |
| 2007/0113579 A1 | 5/2007 | Claeys et al. | |
| 2008/0139099 A1 * | 6/2008 | Baldauf | B60H 1/323 454/71 |
| 2008/0264084 A1 * | 10/2008 | Derouineau | B64D 13/06 62/172 |
| 2009/0117840 A1 * | 5/2009 | Kresser | B64D 13/06 454/71 |
| 2013/0118190 A1 * | 5/2013 | Bruno | B64D 13/02 62/87 |
| 2014/0161698 A1 * | 6/2014 | Klimpel | B01D 53/1425 423/228 |
| 2014/0331857 A1 * | 11/2014 | Massey | B64D 37/32 95/8 |
| 2015/0251765 A1 * | 9/2015 | Jonqueres | B64D 13/08 62/86 |
| 2015/0251766 A1 | 9/2015 | Atkey | |
| 2016/0083100 A1 | 3/2016 | Bammann et al. | |
| 2016/0311538 A1 | 10/2016 | Bruno et al. | |
| 2016/0311539 A1 | 10/2016 | Bruno et al. | |
| 2016/0312648 A1 | 10/2016 | Bruno et al. | |
| 2016/0347456 A1 | 12/2016 | Bruno et al. | |

* cited by examiner

TURBINE-ASSISTED CABIN AIR COMPRESSOR

BACKGROUND

In a conventional electric environmental control system (CECS), a maximum power condition is required for delivering air to a cabin of an aircraft during a maximum cruise altitude of the aircraft. At the maximum cruise altitude, a pressure ratio of a compressor of the CECS is dictated by a need to increase a pressure from ambient (e.g., approximately 3 psia at this condition) to a value high enough to pressurize the cabin, overcome pressure losses regarding compression heat, transport the air to the cabin, and (in the case of an air cycle ECS) create refrigeration on hot day conditions. To provide this value, the CECS requires 100% of the compressor power to come from a motor and an electrical system. This maximum power condition can increase the size of electrical generators and motor controllers, and define motor and motor controller cooling requirements.

BRIEF DESCRIPTION

According to one or more embodiments, a motor-driven compressor assembly is provided. The motor-driven compressor assembly includes a shaft, a motor, a compressor, and a turbine coupled to the compressor via the shaft. The motor provides a first power to the compressor via the shaft. The turbine receives and expands a second medium to provide a second power to the compressor via the shaft. The compressor receives and compresses a first medium in accordance with the first power provided by the motor and the second power provided by the turbine.

According to one or more embodiments or the motor-driven compressor assembly embodiment above, the motor-driven compressor assembly can be comprised of at least one heat exchanger is configured to cool the second medium.

According to one or more embodiments or any of the motor-driven compressor assembly embodiments above, the at least one heat exchanger can be configured to cool the second medium by utilizing the first medium.

According to one or more embodiments or any of the motor-driven compressor assembly embodiments above, the at least one heat exchanger can be configured to downstream of the turbine on a flow path of the second medium.

According to one or more embodiments or any of the motor-driven compressor assembly embodiments above, the at least one heat exchanger can be configured to downstream of the compressor on a flow path of the first medium.

According to one or more embodiments or any of the motor-driven compressor assembly embodiments above, the first medium can be fresh air and the second medium can be cabin discharge air.

According to one or more embodiments or any of the motor-driven compressor assembly embodiments above, the second medium can flow to a ram circuit or overboard after exiting the motor-driven compressor assembly.

According to one or more embodiments or any of the motor-driven compressor assembly embodiments above, an environmental control system of an aircraft can comprise the motor-driven compressor assembly.

According to one or more embodiments or any of the motor-driven compressor assembly embodiments above, the environmental control system can further comprise at least one air conditioning pack.

According to one or more embodiments, an environmental control system is provided. The environmental control system comprises an air conditioning pack; a mixing circuit; and a motor-driven compressor assembly comprising a shaft, a motor, a compressor, and a turbine coupled to the compressor via the shaft, wherein the motor provides a first power to the compressor via the shaft, wherein the turbine receives and expands a second medium to provide a second power to the compressor via the shaft, wherein the compressor receives and compresses a first medium in accordance with the first power provided by the motor and the second power provided by the turbine.

According to one or more embodiments or the environmental control system embodiment above, the motor-driven compressor assembly can comprise at least one heat exchanger configured to cool the second medium.

According to one or more embodiments or any of the environmental control system embodiments above, the at least one heat exchanger can be configured to cool the second medium by utilizing the first medium.

According to one or more embodiments or any of the environmental control system embodiments above, the at least one heat exchanger can be downstream of the turbine on a flow path of the second medium.

According to one or more embodiments or any of the environmental control system embodiments above, the at least one heat exchanger can be downstream of the compressor on a flow path of the first medium.

According to one or more embodiments or any of the environmental control system embodiments above, the first medium can be fresh air and the second medium is cabin discharge air.

BRIEF DESCRIPTION OF THE DRAWINGS

The subject matter is particularly pointed out and distinctly claimed in the claims at the conclusion of the specification. The forgoing and other features, and advantages thereof are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the FIGS.

Embodiments herein provide a motor-driven compressor assembly comprising a turbine powered by air exiting a cabin drawing its power from the pressure difference between cabin pressure and ambient pressure. As a result, while the power required by a compressor of the motor-driven compressor assembly is unchanged, an input power to an electric motor is reduced by a power of the turbine. The technical effects and benefits of the above the motor-driven compressor assembly includes a reduction of a power level, which provides more efficient means of cooling motor controllers and decreases a size motor controllers, generators, and feeder lines comparatively to the CECS.

Figure 1:
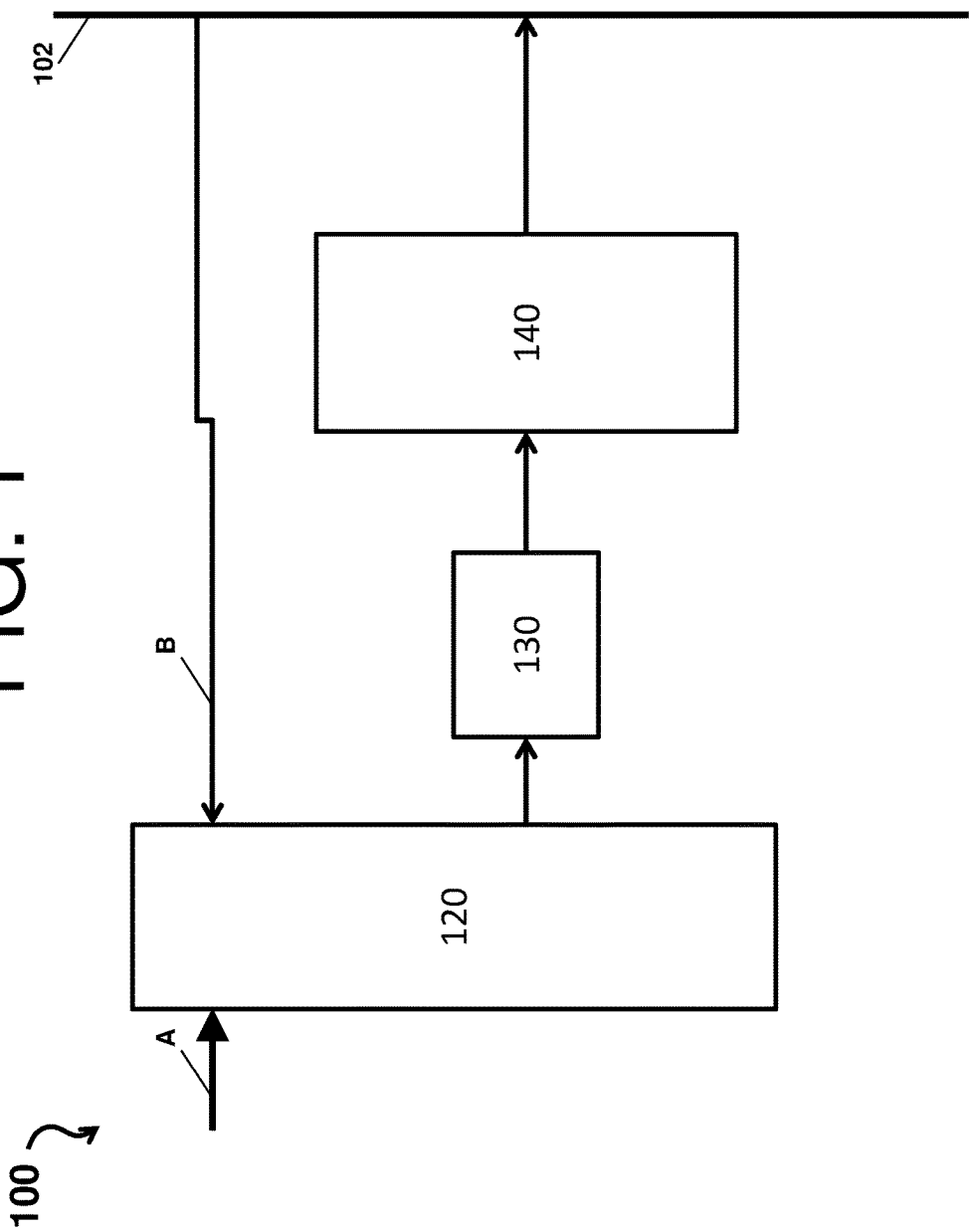
FIG. 1 is a diagram of a schematic of an environmental control system according to one or more embodiments.

Turning now to FIG. 1, a diagram of a schematic of an environmental control system 100 is depicted according to one or more embodiments. The environmental control system 100 comprises a volume 102, a motor-driven compressor assembly 120, an air conditioning pack 130, and a mixing circuit 140.

The environmental control system 100 is an example of an environmental control system of an aircraft that conditions and mixes mediums from different sources (e.g., arrows A and B) and uses the different energy sources to power the environmental control system and to provide cabin pressurization and cooling at high electric efficiency (e.g., provide a pressurized medium to the volume 102). The medium can generally be air, while other examples include gases, liquids, fluidized solids, or slurries.

The elements of the environmental control system 100 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the environmental control system 100. Valves can be operated by actuators, such that flow rates of the medium in any portion of the environmental control system 100 can be regulated to a desired value.

The schematic of the environmental control system 100 is depicted according to a non-limiting embodiment, as it could be installed on an aircraft. The aircraft example is not intended to be limiting, as alternative embodiments are contemplated In view of the above aircraft embodiment, a first medium can be fresh air (e.g., arrow A), which can be outside air destined to enter the volume 102. The outside air can be procured by one or more scooping mechanisms, such as an impact scoop or a flush scoop. These scooping mechanisms can be considered fresh air or outside air inlets. Generally, the fresh air described herein is at an ambient pressure outside of the aircraft with respect to altitude.

A second medium can be procured from the volume 102 (e.g., arrow B). That is, the third medium can be cabin discharge air, which can be air leaving the volume 102 and dumped/discharged overboard. For example, the cabin discharge air can be supplied to a destination, such as an outlet. Examples of the outlet can include, but are not limited to, a ram circuit (which exhausts overboard) and/or overboard.

The mixing circuit 140 is a mechanical configuration that receives a conditioned medium flowing from the air conditioning pack 130 and the motor-driven compressor assembly 120 and provides a resulting medium to the volume 102.

The air conditioning pack 130 can perform or extract work from the above mediums to achieve certain operations required at different altitudes. The air conditioning pack 130 can comprise a ram circuit including a shell encasing one or more heat exchangers. The shell can receive and direct a medium (such as ram air described herein) through its corresponding pack. The one or more heat exchangers are devices built for efficient heat transfer from one medium to another. Examples of heat exchangers include double pipe, shell and tube, plate, plate and shell, adiabatic wheel, plate fin, pillow plate, and fluid heat exchangers. The one or more heat exchangers encased by the shell can be referred to as ram heat exchangers.

The air conditioning pack 130 can comprise a compressing device including various combinations of compressors, turbines, fans, and shafts. The compressing device is a mechanical device that includes components for performing thermodynamic work on the mediums. Examples of the compressing device include an air cycle machine, a three-wheel air cycle machine, a four-wheel air cycle machine, etc. The air conditioning pack 130 can also comprise water extractors, a condensers, etc.

The motor-driven compressor assembly 130 can comprise different arrangements of compressors and heat exchangers, which can be used to reduce an overall power requirement. Example arrangements will now be described with respect to FIGS. 2-3.

Figure 2:
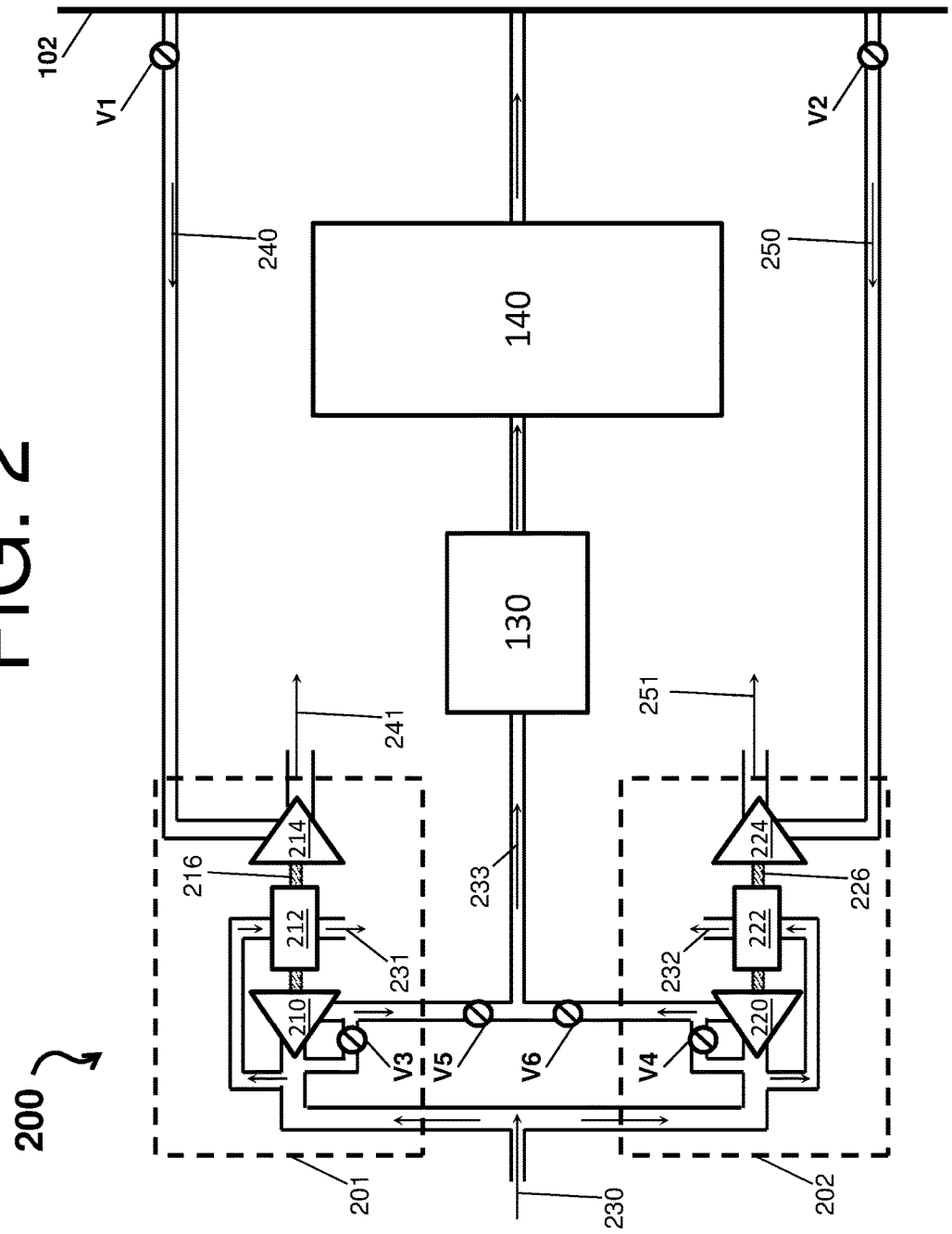
FIG. 2 is a diagram of a schematic of an environmental control system according to one or more embodiments.

FIG. 2 is a diagram of a schematic of an environmental control system 200 according to one or more embodiments. Components of the environmental control system 200 that are similar to the environmental control system 100 have been reused for ease of explanation, by using the same identifiers, and are not re-introduced. The environmental control system 200 comprises a first motor-driven compressor assembly 201 and a second motor-driven compressor assembly 202. Note that while two assemblies 201 and 202 are shown, the environmental control system 200 can include one, three, or more assemblies according to one or more embodiments.

The first motor-driven compressor assembly 201 comprises compressor 210, a motor 212, a turbine 214, and a shaft 216. The second motor-driven compressor assembly 201 comprises compressor 220, a motor 222, a turbine 224, and a shaft 226. Additionally, the environmental control system 200 also comprises valves V1, V2, V3, V4, V5, and V6, along with the mediums 230, 231, 232, 233, 240, 241, 250, and 251.

In an example operation of the environmental control system 200, the compressor 210 receives and compresses the medium 230 (e.g., fresh air) in accordance with a first power provided by the motor 212. Further, the medium 240 (e.g., cabin discharge air) provides a power source to the turbine 214 by the medium 240 expanding across the turbine 214. In turn, the compressor 210 receives and compresses the medium 230 (e.g., fresh air) in accordance with a second power provided by the turbine 214. The compressor 210 can compresses the medium 230 based on the first power, the second power, or a combination thereof. Note that the pressure difference between ambient pressure outside an aircraft at cruise (e.g., approximately 3 psia at this condition) and cabin pressure inside the aircraft (e.g., approximately 11 psia at this condition) causes a pressure drop across the turbine 214 that forces the medium 240 through the turbine 214.

Further, the compressor 220 receives and compresses the medium 230 (e.g., fresh air) in accordance with a first power provided by the motor 222. Further, the medium 250 (e.g., cabin discharge air) provides a power source to the turbine 224 by the medium 250 expanding across the turbine 224. In turn, the compressor 220 receives and compresses the medium 230 (e.g., fresh air) in accordance with a second power provided by the turbine 224. The compressor 220 can compresses the medium 230 based on the first power, the second power, or a combination thereof. Note that the pressure difference between ambient pressure outside an aircraft at cruise (e.g., approximately 3 psia at this condition) and cabin pressure inside the aircraft (e.g., approximately 11 psia at this condition) causes a pressure drop across the turbine 224 that forces the medium 250 through the turbine 224.

Figure 3:
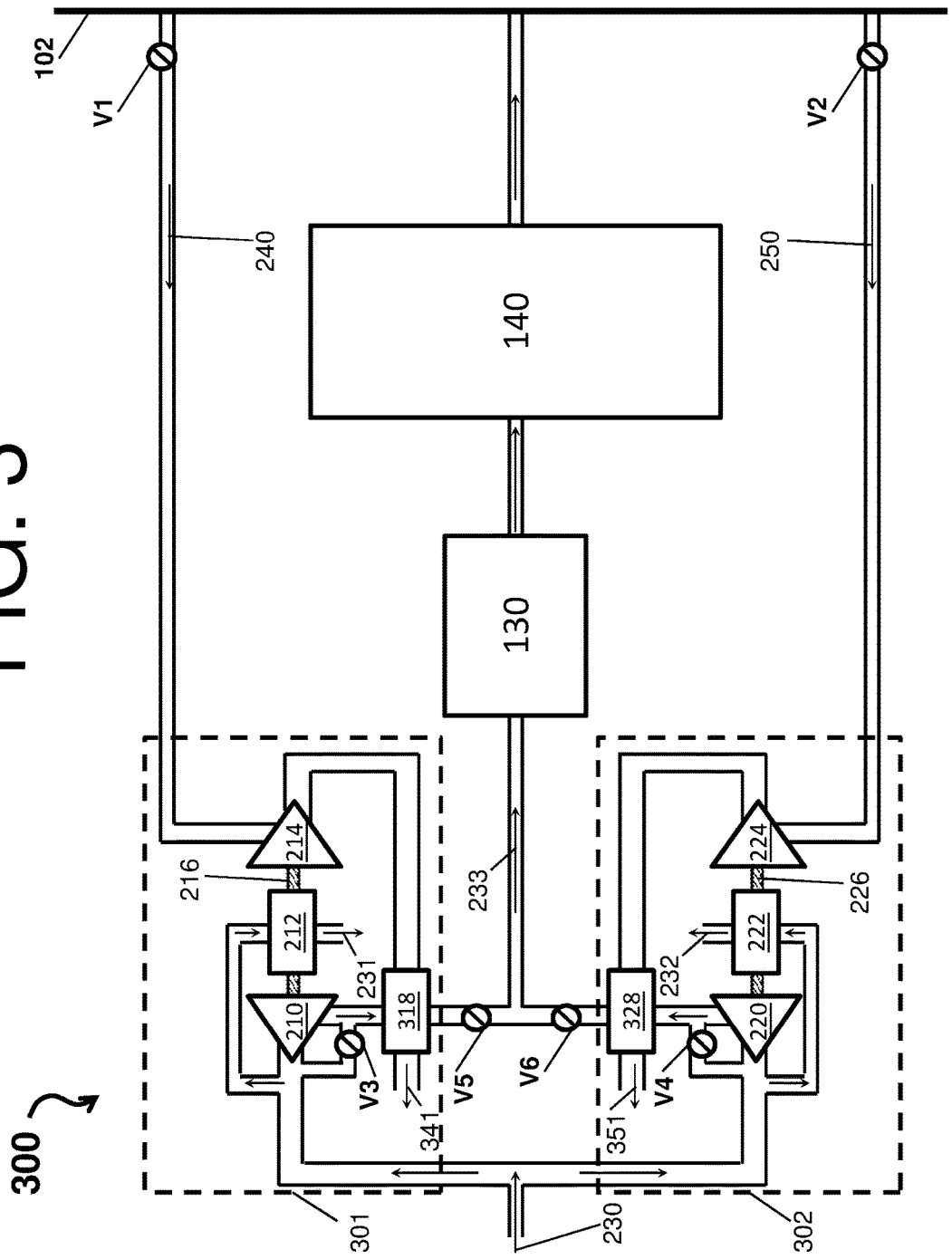
FIG. 3 is a diagram of a schematic of an environmental control system according to one or more embodiments.

FIG. 3 is a diagram of a schematic of an environmental control system 300 according to one or more embodiments. Components of the environmental control system 300 that are similar to the environmental control systems 100 and 200 have been reused for ease of explanation, by using the same identifiers, and are not re-introduced. The environmental control system 300 comprises a first motor-driven compressor assembly 301 and a second motor-driven compressor assembly 302. Note that while two assemblies 301 and 302 are shown, the environmental control system 300 can include one, three, or more assemblies according to one or more embodiments. In the two assemblies 301 and 302, heat exchangers 318 and 328 are added to cool a discharge of the compressors 210 and 221 with a discharge of the turbines 214 and 224. The heat exchangers 318 and 328 are downstream of the turbine 214 and 224 on flow paths of the mediums 240 and 250, respectively. The heat exchangers 318 and 328 are also downstream of the compressors 210 and 221 on flow paths of the medium 230. the environmental control system 200 depicts the mediums 350 and 351 exiting the heat exchangers 318 and 328, respectively. The mediums 350 and 351 can thus be reused elsewhere in the aircraft.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of embodiments herein. For instance, the steps may be performed in a differing order or steps may be added, deleted or modified. All of these variations are considered a part of the claims.

While the preferred embodiment has been described, it will be understood that those skilled in the art, both now and in the future, may make various improvements and enhancements which fall within the scope of the claims which follow. These claims should be construed to maintain the proper protection.

What is claimed is:

1. A motor-driven compressor assembly fluidly coupled to at least one air conditioning pack, comprising:
    a shaft;
    a motor;
    a compressor;
    a turbine coupled to the compressor via the shaft,
    wherein the motor provides a first power to the compressor via the shaft,
    wherein the turbine receives and expands a second medium to provide a second power to the compressor via the shaft,
    wherein a first medium is provided to the motor and to the compressor, the compressor is operable to compresses the first medium in accordance with the first power provided by the motor and the second power provided by the turbine; and
    at least one heat exchanger fluidly coupled to an outlet of the compressor and an outlet of the turbine, the at least one heat exchanger being located upstream from the at least one air conditioning pack along a flow path of the first medium, wherein the first medium is cooled by the second medium within the at least one heat exchanger, and the cool first medium output from the at least one heat exchanger is provided to the at least one air conditioning pack.

2. The motor-driven compressor assembly of claim 1, wherein the at least one heat exchanger is downstream of the turbine on a flow path of the second medium.

3. The motor-driven compressor assembly of claim 1, wherein the first medium is fresh air and the second medium is cabin discharge air.

4. The motor-driven compressor assembly of claim 1, wherein the second medium flows to a ram circuit or directly overboard after exiting the motor-driven compressor assembly.

5. The motor-driven compressor assembly of claim 1, wherein an environmental control system of an aircraft comprises the motor-driven compressor assembly.

6. The motor-driven compressor assembly of claim 5, wherein the environmental control system further comprises the at least one air conditioning pack.

7. An environmental control system, comprising:
    an air conditioning pack;
    a mixing circuit; and
    a motor-driven compressor assembly comprising a shaft, a motor, a compressor, a turbine coupled to the compressor via the shaft, and at least one heat exchanger,
    wherein the motor provides a first power to the compressor via the shaft,
    wherein the turbine receives and expands a second medium to provide a second power to the compressor via the shaft,
    wherein a first medium is provided to the motor and to the compressor, the compressor is operable to compresses the first medium in accordance with the first power provided by the motor and the second power provided by the turbine; and
    the at least one heat exchanger fluidly coupled to an outlet of the compressor and an outlet of the turbine, the at least one heat exchanger being located upstream from the one air conditioning pack along a flow path of the first medium, wherein the first medium is cooled by the second medium within the at least one heat exchanger, and the cool first medium output from the at least one heat exchanger is provided to the one air conditioning pack.

8. The environmental control system of claim 7, wherein the at least one heat exchanger is downstream of the turbine on a flow path of the second medium.

9. The environmental control system of claim 7, wherein the first medium is fresh air and the second medium is cabin discharge air.

* * * * *